United States Patent [19]

Kuitunen

[11] 4,112,908
[45] Sep. 12, 1978

[54] FUEL SYSTEM MODIFICATION

[76] Inventor: Robert Kuitunen, 8145 Highway 85, Riverdale, Ga. 30274

[21] Appl. No.: 700,230

[22] Filed: Jun. 28, 1976

[51] Int. Cl.² .............................................. F02D 13/06
[52] U.S. Cl. ................................................. 123/198 F
[58] Field of Search ...... 123/198 F, DIG. 1, DIG. 7, 123/DIG. 8, 75 B

[56] References Cited

U.S. PATENT DOCUMENTS

| | | | |
|---|---|---|---|
| 2,085,818 | 7/1937 | Messinger | 123/198 F |
| 2,114,655 | 4/1938 | Leibing | 123/198 F |
| 2,250,814 | 7/1941 | Rohlin | 123/109 F |
| 2,623,617 | 12/1952 | Snyder et al. | 123/198 F X |
| 2,757,651 | 8/1956 | Winkler | 123/198 F X |
| 2,875,742 | 3/1959 | Dolza | 123/198 F X |
| 3,578,116 | 5/1971 | Nakajima et al. | 123/198 F X |

*Primary Examiner*—Charles J. Myhre
*Assistant Examiner*—Ira S. Lazarus
*Attorney, Agent, or Firm*—Newton, Hopkins & Ormsby

[57] ABSTRACT

A system for splitting the power output and fuel consumption of an internal combustion engine to increase its performance efficiency while decreasing fuel consumption over the various load and speed ranges, by employing a part of all of the engine. The range of cylinder employment is achieved by electric limit sensing switches located and actuated by the existing vehicle brake and accelerator pedals.

1 Claim, 4 Drawing Figures

FUEL SYSTEM MODIFICATION

BACKGROUND OF THE INVENTION

The problem of having to fuel and utilize all cylinders of an automotive engine, regardless of power required, has posed a vexing challenge to the automotive field. The simple fact that an engine of six of eight cylinders provided maximum power for the vehicle for which it was designed, yet maximum power is a variable requirement, since starting and acceleration call for greater power as opposed to constant speeds after acceleration, which require far less power. Regardless of conditions, the necessity of utilizing full power leads to excessive and unnecessary fuel consumption resulting in large wastes of fuel and expense. While there have been many attempts devoted to splitting the power of an engine so that fewer cylinders are employed at a time when lesser power is required, and yet provide reserve power through reserve cylinders is known, excessive alterations to standard engines have made past concepts prohibitive due to the expense and impracticalities involved.

SUMMARY OF THE INVENTION

The present invention provides for simple conversion of existing four or six cylinder engines which may be split by employment of carburetors which are electrically employed by switches located for actuation by the existing conventional brake and accelerator pedals. Another object of the invention is to provide an eight cylinder engine which may selectively be made to operate as a six cylinder engine and being split to operate on four cylinders for constant running, or low power conditions. The object of economy and practical application are paramount and are fundamental to this invention. The still further object of simplicity lends further to the economical and practical aspects which enhance its employment and extensive and continued use. It is another object to present versatility, in that the present invention may be completely automatic or manual in use. Other new and useful advantages and features of the invention become more readily apparent from the following detailed description of preferred embodiments thereof when taken together with the accompanying drawings in which:

Figure 1:
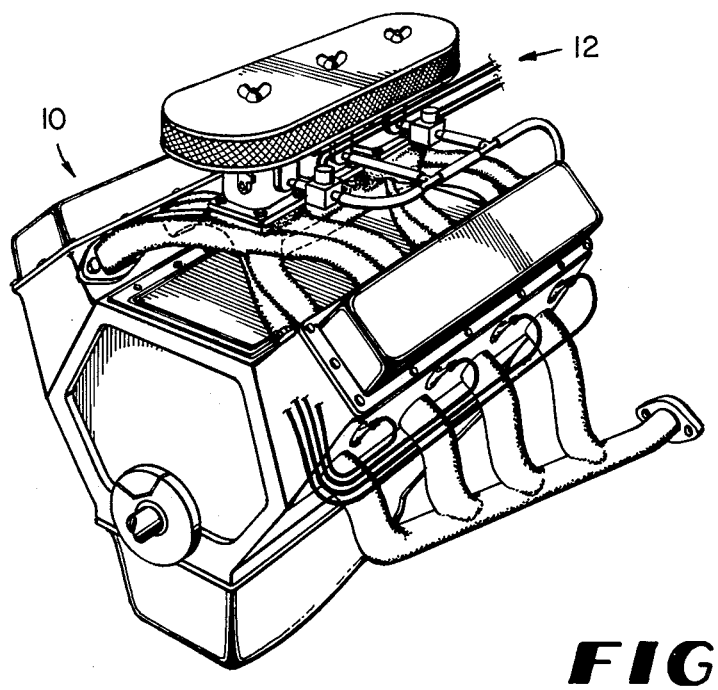
FIG. 1 is a perspective view of an eight cylinder engine with three carburetors fixed for selectively splitting the power output.
Figure 2:
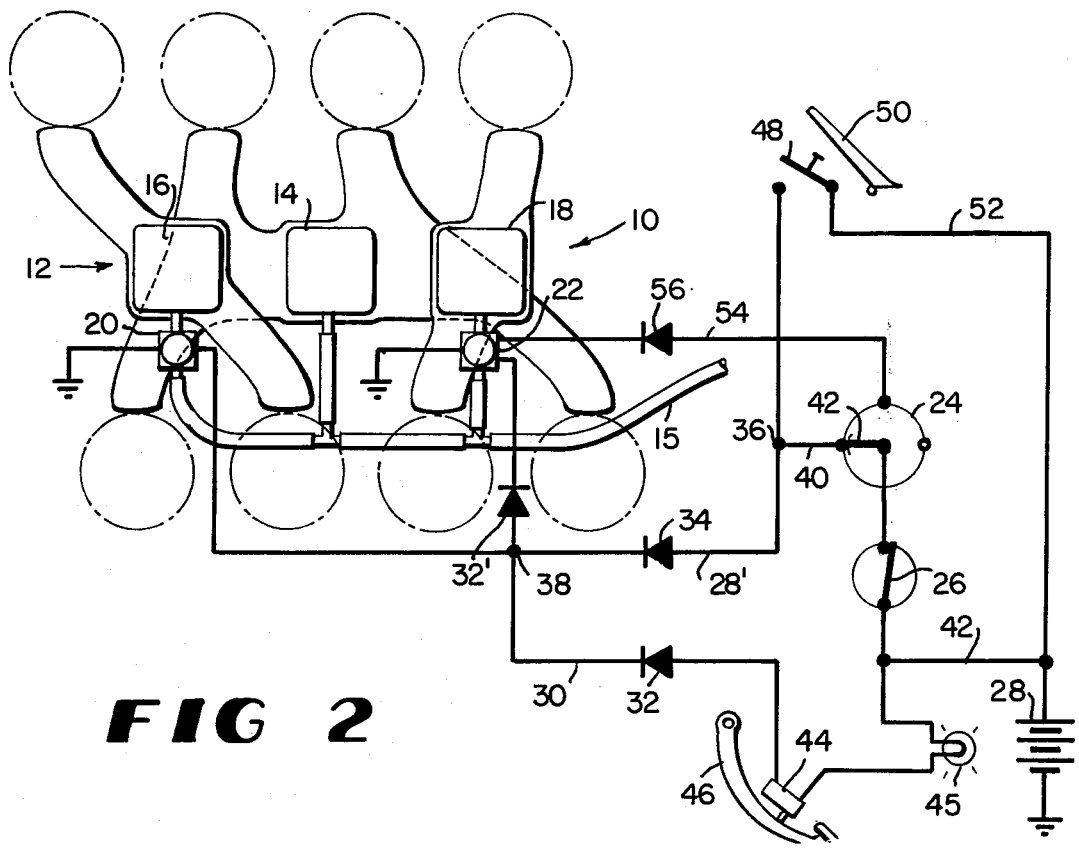
FIG. 2 is a schematic top plan view of the engine shown in FIG. 1 along with its associated components and wiring.

Referring now in more detail to the drawings and more particularly to FIGS. 1 and 2, reference numeral 10 generally indicates a conventional eight cylinder internal combustion engine while reference numeral 12 generally indicates a three carburetor arrangement with air intake manifolds and distribution. The carburetors 12 provide means to selectively fuel all or parts of the engine 10, depending on the engine load or vehicle acceleration and deceleration. In this embodiment of the invention four of the eight cylinders (FIG. 2) are controlled by conventional linkage responsive carburetor 14 and is continuously operative while the engine 10 is running, in the standard manner of linkage responsive carburetors through fuel line 15. In this standard manner, it forms one side of the split engine providing minimum power for effective minimum engine load operation. The remaining four cylinders are operated in pairs and are responsive to a pair of tandem or singularly operable electric controlled carburetors 16 and 18. This arrangement permits the engine to function in a six or eight cylinder capacity depending on requirements. Solenoid control valves 20 and 22 provide means for activating all or part of the second side of the split engine. Six or eight cylinder operation is provided by rotary selector switch 24 which is manually operated by the vehicle operator. This selection may be made prior to engine start or may be made while the engine is in operation. For example, if the vehicle operator decides to operate the engine on six cylinders and determines while running, that insufficient power exists, the rotary switch 24 may be repositioned to achieve full power or eight cylinder operation. Conversely, if eight cylinder operation is initially selected, six cylinder selection may be achieved while running. A conventional on/off switch 26 is provided to activate the solenoid valve control circuit. The switch 26 may be located in the ignition switch so as to coordinate the electrical system of the present invention with the overall electrical system of the vehicle and to the car battery 28 as seen in FIG. 2. The switches 24 and 26 are wired to the solenoids 20 and 22 by lines having rectifiers 32, 32' and 34. Wire lines 28' and 30 are junctured as at 36 and 38 to permit simultaneous actuation of the solenoids 20 and 22 when the engine is operated at full eight cylinder capacity through the selector switch 24 and line 40 to the switch arm and then to the vehicle battery 28 through wire line 42. A normally open limit switch 44 is held in the open position by the brake arm 46 of the vehicle to interrupt the circuit and hold it in an open position until such time as pressure is applied to the brake arm 46. At this time, the switch 44 is closed, completing the circuit to the normally closed solenoid valves 20 and 22, permitting fuel to flow from the fuel line 15 and consequently permitting all cylinders to become functional and operative increasing its capacity from four to eight operationally fired cylinders. A signal light 45 which may be mounted on the instrument panel of the car, is provided as an indicator means for the operator. A normally open limit switch 48 is positioned approximately midway in the path of travel of the accelerator 50 of the vehicle. It will be seen particularly with reference to FIG. 2 that as the accelerator 50 is depressed approximately one half its distance of full travel, switch 48 is actuated, closing the circuit through lines 28' and 52 from the battery power source 28, to open the solenoid control valves 20 and 22, providing fuel to the carburetors 16 and 18 increasing the engine firing capacity from four to eight cylinders.

From the foregoing it will be seen that the fuel system of a standard automobile engine 10 is modified so that one half of the cylinders are delivered fuel constantly by carburetor 14 and the remaining half 16 and 18 are delivered fuel only during a preset throttle acceleration pedal 50, when brakes are applied, through crank arm 46 of the brake pedal, or when manually engaged. The principle of operation is that full cylinder power is needed only on takeoff, and since brakes are usually applied prior to takeoff situations, the fuel is provided to all cylinders for this condition by simply applying the brakes. A sufficient amount of fuel enters the fuel lines to the secondary carburetors to provide full cylinder operation during takeoff while half cylinder operation is adequate and more efficient while cruising at near constant speeds. The opening of the throttle past the preset point allows a continuous flow of fuel to all cylinders during acceleration. A manual override may be employed to provide for full cylinder operation at any time.

Continuing with reference to FIG. 2, an alternative of selectively providing for split four-six engine operation is achieved by positioning the previously described selector switch 42 so as to permit current flow to the solenoid 22 of carburetor 18 through wire lead 54 and rectifier 56. The same principle and operation for the eight cylinder function applies, in that only two carburetors of the three are employed to render six of the eight cylinders operational by positioning of the selector switch 24.

Figure 3:
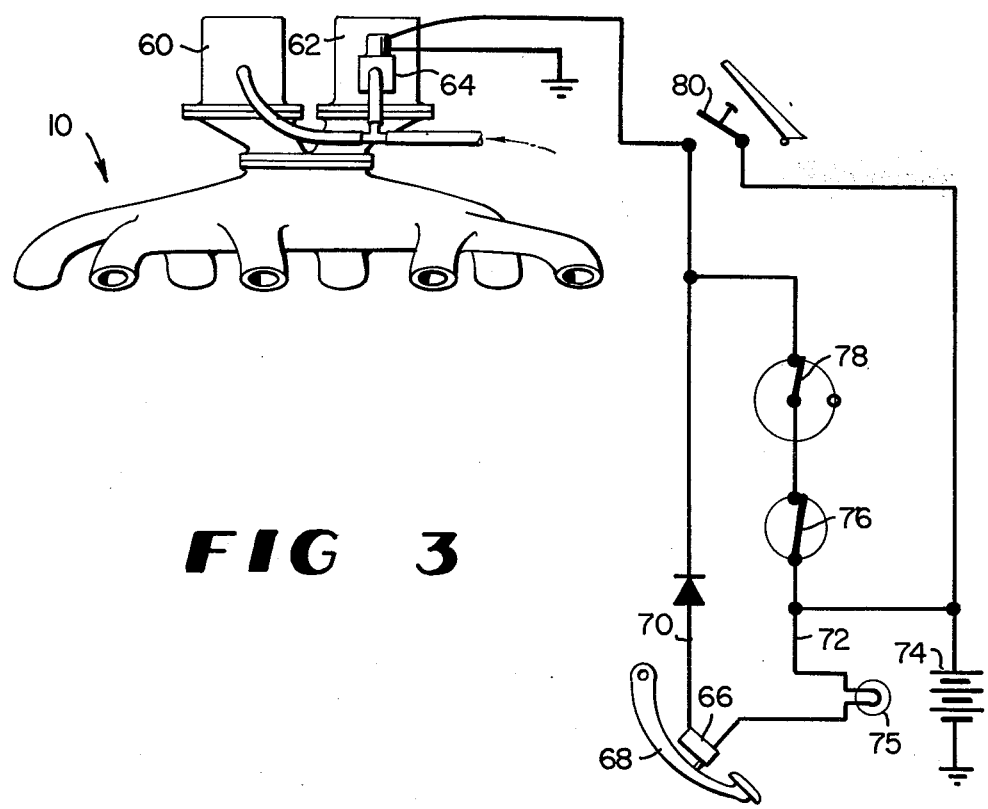
FIG. 3 is a side elevational view of a modified form of the invention showing an eight cylinder engine ahving two carburetors and its associated components and wiring.

Referring now more particularly to FIG. 3 of the drawing, a modified form of split engine is shown. In this form, a conventional eight cylinder split engine is achieved with two carburetors 60 and 62. Carburetor 60 provides fuel continuously to four of the eight cylinders while running, in the same manner as the previously described carburetor 14.

The total operation of eight cylinders is achieved by combined operation of carburetors 60 and 62. The carburetor 62 becomes operational through actuation of a normally closed solenoid valve 64 by means hereinafter described.

The solenoid 64 is electrically responsive in a similar manner as that shown in FIG. 2, with the exception of being applied to a single solenoid valve operated carburetor 64. The solenoid valve is operated by a normally open limit switch 66 located beneath the brake pedal arm 68 through wire lines 70 and 72 to the power source 74 of the vehicle. Line 72 has an on/off switch 76 therein which may be located in the ignition switch for practical purposes. A signal light 75 on the instrument panel, similar to 45 previously described, is provided for the operator. The line 72 also carries a selector switch 78 for manual or selective operation. A second normally open limit switch 80 is located within the arcuate travel of the accelerator. The principle of operation is the same as that previously described for FIG. 2.

Figure 4:
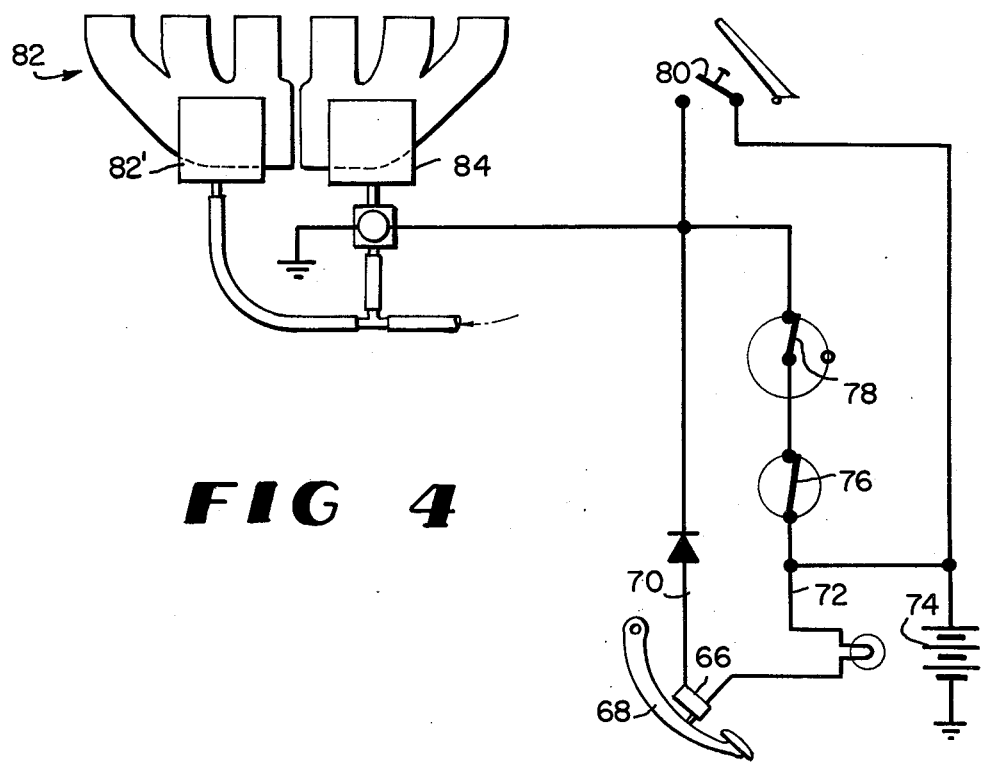
FIG. 4 is a top plan view of a still further modified form of the invention showing a six cylinder engine as being split and controlled by two carburetors and its associated components and wiring.

Referring now to FIG. 4, a still further modified form is shown similar in all respects to FIG. 3 and illustrating a six cylinder engine 82 split and controlled by continuously fuel fed carburetor 82' and electrically controlled carburetor 84. All other components and principle of operation are identical to those shown in FIG. 3.

From the illustrated and described embodiments of the invention, it will be seen that great versatility of split engine utilization is provided while substantially reducing conversion costs, along with fuel and maintenance costs etc., and at the same time providing a completely safe operating unit for all combinations which might be employed.

Manifestly, minor changes in detail can be effected without departing from the spirit and scope of the invention as defined in and limited solely by the appended claims.

I claim:

1. An economizing fuel supply system for multi-cylinder internal combustion engines having first, second and third groups of cylinders and further having conventional accelerator pedal and brake pedal linkages, comprising:

(a) a first carburetor on said engine to continuously supply fuel to said first group of cylinders;

(b) a second carburetor on said engine to supply fuel to said second group of cylinders;

(c) a third carburetor on said engine to supply fuel to said third group of cylinders;

(d) an electrical switching circuit including an accelerator pedal switch operable upon a predetermined movement of said accelerator pedal and a brake pedal switch operable upon a predetermined movement of said brake pedal, said accelerator pedal switch and said brake pedal switch independently operable to actuate said second and third carburetors simultaneously; and (e) a manually operable switch in said circuit for selective actuation among said first carburetor, a combination of said first, second and third carburetors and a combination of said first and second carburetors.

* * * * *